(12) United States Patent
Chan

(10) Patent No.: US 7,308,039 B2
(45) Date of Patent: Dec. 11, 2007

(54) METHOD AND SYSTEM FOR A REDUCED EMISSIONS DIRECT DRIVE TRANSMITTER FOR UNSHIELDED TWISTED PAIR (UTP) APPLICATIONS

(75) Inventor: Kevin T. Chan, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 343 days.

(21) Appl. No.: 11/154,009

(22) Filed: Jun. 16, 2005

(65) Prior Publication Data
US 2005/0232372 A1    Oct. 20, 2005

Related U.S. Application Data

(63) Continuation of application No. 10/612,083, filed on Jul. 2, 2003, now Pat. No. 6,925,130, which is a continuation-in-part of application No. 10/091,099, filed on Mar. 5, 2002, now Pat. No. 6,690,742, which is a continuation of application No. 09/568,520, filed on May 9, 2000, now Pat. No. 6,389,077, which is a continuation of application No. 09/399,202, filed on Sep. 17, 1999, now Pat. No. 6,185,263, said application No. 10/612,083 is a continuation-in-part of application No. 09/429,893, filed on Oct. 29, 1999, now Pat. No. 6,259,745, and a continuation of application No. 09/429,892, filed on Oct. 29, 1999, now Pat. No. 6,332,004.

(60) Provisional application No. 60/106,265, filed on Oct. 30, 1998, provisional application No. 60/107,105, filed on Nov. 4, 1998, provisional application No. 60/107,702, filed on Nov. 9, 1998, provisional application No. 60/108,001, filed on Nov. 11, 1998.

(51) Int. Cl.
*H04L 27/00* (2006.01)

(52) U.S. Cl. .................... 375/295; 375/256

(58) Field of Classification Search ............... 375/295, 375/296, 222, 219, 265, 257, 258; 327/108–112; 341/141, 126, 144, 153, 152
See application file for complete search history.

(56) References Cited

U.S. PATENT DOCUMENTS 3,601,544 A * 8/1971 Murphy ............... 370/204

(Continued)

FOREIGN PATENT DOCUMENTS

EP    0 673 139    * 9/1995

(Continued)

OTHER PUBLICATIONS

Jingyu Huang et al. "Simulated Performance of 1000BASE-T Receiver with Different Analog Front End Designs," Solid State Circuit Research Laboratory of Electical and Computer Engineering University of California, 2002, pp. 617-620.*

(Continued)

*Primary Examiner*—Tesfaldet Bocure
(74) *Attorney, Agent, or Firm*—McAndrews, Held & Malloy, Ltd.

(57) ABSTRACT

A reduced emission transmitter may comprise an encoder partitioned into at least a group of odd encoder processing cells and a group of even encoder processing cells. A DAC may be partitioned into at least: a group of odd DAC processing cells for processing outputs of the group of odd encoder processing cells, and a group of even DAC processing cells for processing outputs of the group of even encoder processing cells. The reduced emission transmitter may further comprise an aggregator that aggregates the outputs of the odd DAC processing cells and the outputs of the even DAC processing cells to generate a reduced emissions analog DAC output. At least one clock generator is provided, which generates a first clock signal and a second clock signals that clocks the even encoder processing cells, and the odd encoder processing cells respectively. The second clock signal is a delayed version of the first clock signal.

30 Claims, 9 Drawing Sheets

U.S. PATENT DOCUMENTS

| | | | | |
|---|---|---|---|---|
| 3,963,990 | A | * | 6/1976 | DiFonzo .................... 455/304 |
| 4,682,358 | A | * | 7/1987 | Werner .................. 379/406.08 |
| 4,881,241 | A | * | 11/1989 | Pommier et al. ........... 375/260 |
| 5,138,319 | A | * | 8/1992 | Tesch ......................... 341/156 |
| 5,204,880 | A | * | 4/1993 | Wurster et al. ............. 375/258 |
| 5,267,269 | A | * | 11/1993 | Shih et al. .................. 375/296 |
| 5,325,400 | A | * | 6/1994 | Co et al. ..................... 375/296 |
| 5,399,996 | A | * | 3/1995 | Yates et al. ................... 331/74 |
| 5,600,321 | A | * | 2/1997 | Wincn ........................ 341/144 |
| 5,640,605 | A | * | 6/1997 | Johnson et al. ............... 710/61 |
| 5,651,029 | A | * | 7/1997 | Yang et al. ................. 375/296 |
| 5,684,482 | A | * | 11/1997 | Galton ....................... 341/144 |
| 5,745,564 | A | * | 4/1998 | Meek .................... 379/406.08 |
| 5,798,661 | A | * | 8/1998 | Runaldue et al. ........... 327/106 |
| 5,896,417 | A | * | 4/1999 | Lau ............................ 375/258 |
| 5,995,555 | A | * | 11/1999 | Young ........................ 375/296 |
| 6,154,784 | A | * | 11/2000 | Liu ............................. 709/250 |
| 6,160,851 | A | * | 12/2000 | Brown et al. ............... 375/254 |
| 6,332,004 | B1 | * | 12/2001 | Chan .......................... 375/257 |
| 2002/0105592 | A1 | * | 8/2002 | Felts et al. .................. 348/554 |
| 2004/0170226 | A1 | * | 9/2004 | Agazzi ....................... 375/260 |

FOREIGN PATENT DOCUMENTS

| | | | |
|---|---|---|---|
| EP | 0 763 917 | * | 3/1997 |
| EP | 0 863 640 | * | 9/1998 |
| WO | WO 92/11702 | * | 7/1992 |

OTHER PUBLICATIONS

Cherubini et al., "100Base-T2: 100<bits/s Ethernet over Two Pairs of Catogery-3 Cabling," Aug. 1997, pp. 1014-1018.*

Goldberg, "100Base_T4 Chip Brings Speed to Todays' LAN," 2328 Electronic Design, Feb. 1995, pp. 180-182.*

Sommer, "Ethernet Transceiver offers upgrade from Existing networks," 8092 Eelctronic Engineering, Apr. 1995, pp. 25-26, 28 and 30.*

* cited by examiner

METHOD AND SYSTEM FOR A REDUCED EMISSIONS DIRECT DRIVE TRANSMITTER FOR UNSHIELDED TWISTED PAIR (UTP) APPLICATIONS

CROSS-REFERENCE TO RELATED APPLICATIONS/INCORPORATION BY REFERENCE

This application is a continuation of U.S. patent application Ser. No. 10/612,083 filed Jul. 2, 2003, now issued as U.S. Pat. No. 6,925,130 on Aug. 2, 2005, which is a continuation-in-part of U.S. application Ser. No. 10/091,099, filed Mar. 5, 2002, now issued as U.S. Pat. No. 6,690,742 on Feb. 10, 2004, which is a continuation of U.S. patent application Ser. No. 09/568,520, filed May 9, 2000, now U.S. Pat. No. 6,389,077, issued May 14, 2002, which is a continuation of U.S. patent application Ser. No. 09/399,202, filed Sep. 17, 1999, now U.S. Pat. No. 6,185,263, issued Feb. 6, 2001, and is a continuation of U.S. patent application Ser. Nos. 09/429,893, and 09/429,892, filed Oct. 29, 1999, now U.S. Pat. No. 6,259,745, issued Jul. 10, 2001, and U.S. Pat. No. 6,332,004, issued Dec. 18, 2001, which claims the benefit of the filing date of U.S. Provisional Patent Application Ser. Nos. 60/106,265, filed Oct. 30, 1998, 60/107,105, filed Nov. 4, 1998, 60/107,702, filed Nov. 9, 1998, and 60/108,001, filed Nov. 11, 1998, the entire contents of which are hereby expressly incorporated by reference.

FIELD OF THE INVENTION

Certain embodiments of the invention relate to emission control in communication systems utilizing unshielded twisted pair. More specifically, certain embodiments of the invention relate to a method and system for a reduced emissions direct drive transmitter for unshielded twisted pair applications.

BACKGROUND OF THE INVENTION

FIG. 1 is a block diagram of a conventional direct drive transmitter utilized in unshielded twisted pair (UTP) applications. Referring to FIG. 1, there is shown an integrated waveform generator/encoder block 102, a timing and mode control logic block 108, a digital-to-analog converter (DAC) block 110 and a low pass filter (LPF) block 112. The low pass filter block 112 is an optional processing block that may include suitable low pass filtering and line driver circuitry. The waveform generator/encoder block 102 may include a waveform generator block 104 and an encoder block 106.

The waveform generator block 104 may be coupled so that it receives one or more transmitted input data signals 116. These transmitted input data signals may be digital signals. An output signal 120 of the low pass filter 112 may be transmitted to an unshielded twisted pair. In a case where the low pass filter block 112 is not present, output signal 118 of DAC block 110 may be transmitted to the unshielded twisted pair.

The waveform generator block 104 may include suitable circuitry and/or logic such as a digital filter, and may be adapted to generate waveform data from the transmitted input data signal 116. The transmitted input data signals are over-sampled or interpolated to produce a higher rate waveform data. For example, a 20 mega samples per second (Msps) transmitter may be adapted to interpolate by a factor of 16× will produce waveform data at 320 Msps.

An input signal 122 from the encoder block 106 may be coupled to an output of the waveform generator block 104. The encoder block 106 may include, for example, suitable DAC encoder circuitry that may be adapted to convert the generated waveform data into control words to be processed by the DAC block 110. Encoding functions executed by the encoder block 106 may be integrated with functions of the waveform generator 104 into a single waveform generation and encoder block. U.S. Pat. No. 6,411,647 to Chan entitled "Fully Integrated Ethernet Transmitter Architecture with Interpolating Filtering" assigned to Broadcom Corporation of Irvine, Calif., discloses an integrated waveform generator and encoder. Notwithstanding, additional timing functions and techniques may be integrated into encoder block 106 to provide a higher degree of interpolation, which may effectively provide over-sampling.

Referring again to FIG. 1, the timing and mode control logic block 108 includes suitable clock and selector circuitry that is adapted to control the waveform generator block 104 and the encoder block 106. The timing and mode control logic block 108 produces these controls from, for example, either clocks from a phase lock loop (PLL) or from another suitable timing source.

An input of the DAC block 110 is coupled to an output of the encoder block 106. This input of the DAC block 110 receives the output signal generated by the encoder block 106. The DAC block 110 may include suitable DAC circuitry that may be adapted to convert code words generated by the encoder block 106 into suitable waveform contained in output signal 118. The encoded code words generated by the encoder block 106 are applied to the DAC block 110 at the sampling rate such that the DAC block 110 produces waveforms at the sampling rate.

The optional low pass filter block 112 may be added to the output of the DAC block to further assist in reducing unwanted emissions. The term direct drive means that the DAC block of the transmitter 102 is sufficiently designed so that it can directly drive an output load without a need for a subsequent power amplifier. In this regard, it is not necessary to add a power amplifier to amplify the output signal 118 of the DAC block. A direct drive transmitter directly generates a transmitted waveform, namely output signal 118, on a system load. Since the timing and mode control logic block 108 of transmitter 102 is configured to control an amplitude and various timing parameters of signal 118, the timing and mode control logic block 108 alone determines the characteristics of the transmitter 102. Moreover, waveforms may be digitally produced and converted to analog signals by the DAC block 110 so that it can fit within a transmit template of various communication standards and protocols. An over-sampled direct drive transmitter such as transmitter 102 may be adapted to fulfill a variety of template requirements. Accordingly, the direct drive transmitter 102 may be suitably adjusted to accommodate various nuances of a particular template under a variety of test load conditions.

Waveforms generated by the DAC block 110 are also digitally programmable. This permits flexibility in implementing a variety of waveforms for a variety of operational modes and applications. For example, DAC block 110 may be programmed to support 10 Base-T, 100 Base-TX and 1000 Base-T applications. Since the direct drive transmitter 102 is digital programmable, it may be programmed to provide direct control of output voltage of output signal 118. This makes the direct drive transmitter 102 well suited for applications having tight absolute output voltage specifications. For example, the direct drive transmitter 102 suitable for 100 Base-TX applications. Since the transmitter 102 directly drives the load, it does not require a power amplifier which would provide additional variations in the output voltage. In certain applications, the addition of a power amplifier may add unwanted complexity to transmitter design and may require additional circuitry and/or logic to mitigate unwanted effects. Accordingly, the transmitter may require recalibration to operate efficiently. In certain instances, dependent on the transmitter design, an additional complex output filter may also be required to mitigate unwanted signal artifacts.

A direct drive transmitter such as transmitter 102 is more power efficient than other non-direct transmitters because it does not require an additional driver block to drive the line. The DAC block 110 directly takes a bias current from a high accuracy reference source, which may be provided by the timing and mode control logic block 108, and use a simple single current mirror to produce the output drive current. Other transmitter architectures which utilize a combined DAC and line driver have an additional higher power overhead.

The architecture of the direct drive transmitter such as transmitter 102 does provide some scalability and modularity. In this regard, a minimum number of analog functions are provided for optimization and this allows the transmitter design to be easily ported and adapted to new processes and applications. Some of these functions include a current mirror and differential pair. The architecture of the direct drive transmitter provides greater manufacturability and testability over other non-direct drive transmitters. The direct drive transmitter relies on an over-sampled DAC to produce the nuances of the transmit waveform instead of an analog line driver with a filter. For this reason, the clock rate can be lowered to easily evaluate the transmitter's performance and wave-shaping properties.

A direct drive transmitter such as transmitter 102, which utilizes the programmable DAC, avoids any dependence on analog filters whose characteristics can vary widely with factors such as process, temperature, and voltage variations. Hence, while analog filters may require calibration schemes which may be complex or unable to cover all varying operational conditions, the direct drive transmitter 102 is readily programmable to cover a wide range of operational conditions. Finally, the over-sampled DAC approach further ensures predictable and repeatable performance, which may be necessary in order to meet various alternating current (AC) waveform specifications.

The output of a direct drive transmitter is a differential discrete time waveform. The power spectral density of the waveform contains images, which are centered around multiples of the sampling rate. For example, a 16× over-sampled 20 MHz direct drive transmitter produces images around 320 MHz, 640 MHz, 960 MHz and so on. Any sharp edges of the differential waveform may be converted to common-mode energy by effects such as mismatches in the transmitter, terminations, board traces, and magnetic and transmitted medium. This conversion is called differential-to-common-mode conversion. Differential-to-common-mode conversion is more noticeable at higher frequencies because of parasitic effects and non-idealities, which cause mismatches that are more difficult to control.

Common-mode energy typically results in the emission of radiation. In general, a transmitter with high radiation emissions produces a high amount of common-mode energy. The high frequency images in a discrete time waveform of a direct drive transmitter can be readily converted to common-mode energy, which often results in unwanted radiation emissions. In such cases, the application of a simple capacitive low pass filter with a low corner frequency of, for example, less than 100 MHz, to the transmitter output is often ineffective since this will degrade return loss performance. The lowest corner frequency of a single capacitive low pass filter that will provide an optimal return loss performance is about 1 GHz. However, the use of such a filter is insufficient to reduce the high frequency images produced by the direct drive transmitter. This is particularly true in network systems that have high port densities. For example, a 48-port Gigabit switch that utilizes a direct drive transmitter having a single capacitive low pass filter, will have extreme difficulties adhering to emission radiation regulation specifications. This is because the aggregation of emission radiation from the high number of transmitters utilized will readily exceed emission radiation limits established by the regulation specifications.

One solution geared at reducing the aggregation of the emissions from the transmitters includes increasing the over-sampling rate of the direct drive transmitter and increasing the order of the digital filtering. However, this solution will increase the complexity of the DSP filter and clocking speed by a factor equivalent to the increased over-sampling rate. For example, doubling the over-sampling rate will double the hardware and complexity of the transmitter. However, such as method would not be desirable.

FIG. 2 is a graph 200 illustrating a differential waveform power spectral density (PSD) for the direct drive transmitter of FIG. 1. Referring to FIG. 2, the vertical axis represents power and the horizontal axis represents the frequency. A baseband signal 202 is centered on a frequency of zero (0). A plurality of image frequencies is centered on frequencies that are multiples of the sample frequency ($F_s$). For example, a first image frequency 204 is centered on a frequency of $F_s$. A second first image frequency 206 is centered on a frequency of $2*F_s$. A third image frequency 208 is centered on a frequency of $3*F_s$. A fourth image frequency 210 is centered on a frequency of $4*F_s$ and so on.

The power (P) of the image frequencies are represented as follows:

$$P=\text{Power of Baseband Signal}*[\sin(2*\pi*f/F_s)/(2*\pi*f/F_s)]^2,$$

where f represents the frequency and $F_s$ represents the sample frequency. As the frequency increases, the power of the image frequencies decreases. Differential to common mode conversion of the image frequencies causes emission radiation. The use of a simple low pass filter is effective in filtering only the higher image frequencies. For example, the use of a simple low pass filter may be effective in filtering the images at $2*F_s$ and greater. Notwithstanding, the use of a simple low pass filter is not effective in filtering the first image frequency at $F_s$ since it is the largest of the image frequencies. Although increasing the over-sampling rate will reduce the image frequency at Fs, over-sampling rate will double the transmitter hardware, thereby increasing transmitter cost and complexity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for reduced emissions direct drive transmitter for unshielded twisted pair applications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
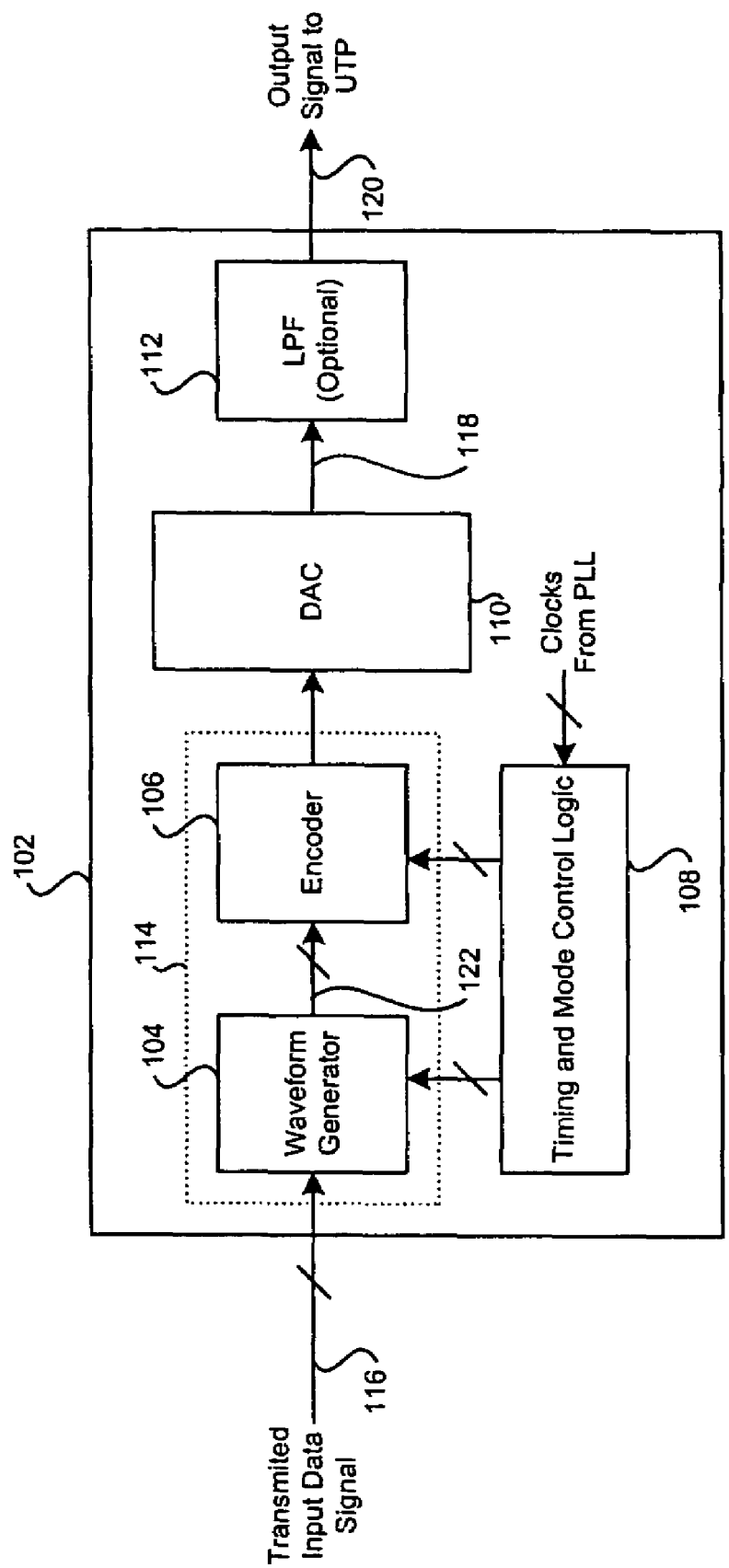
FIG. 1 is a block diagram of a conventional direct drive transmitter utilized in unshielded twisted pair (UTP) applications
Figure 2:
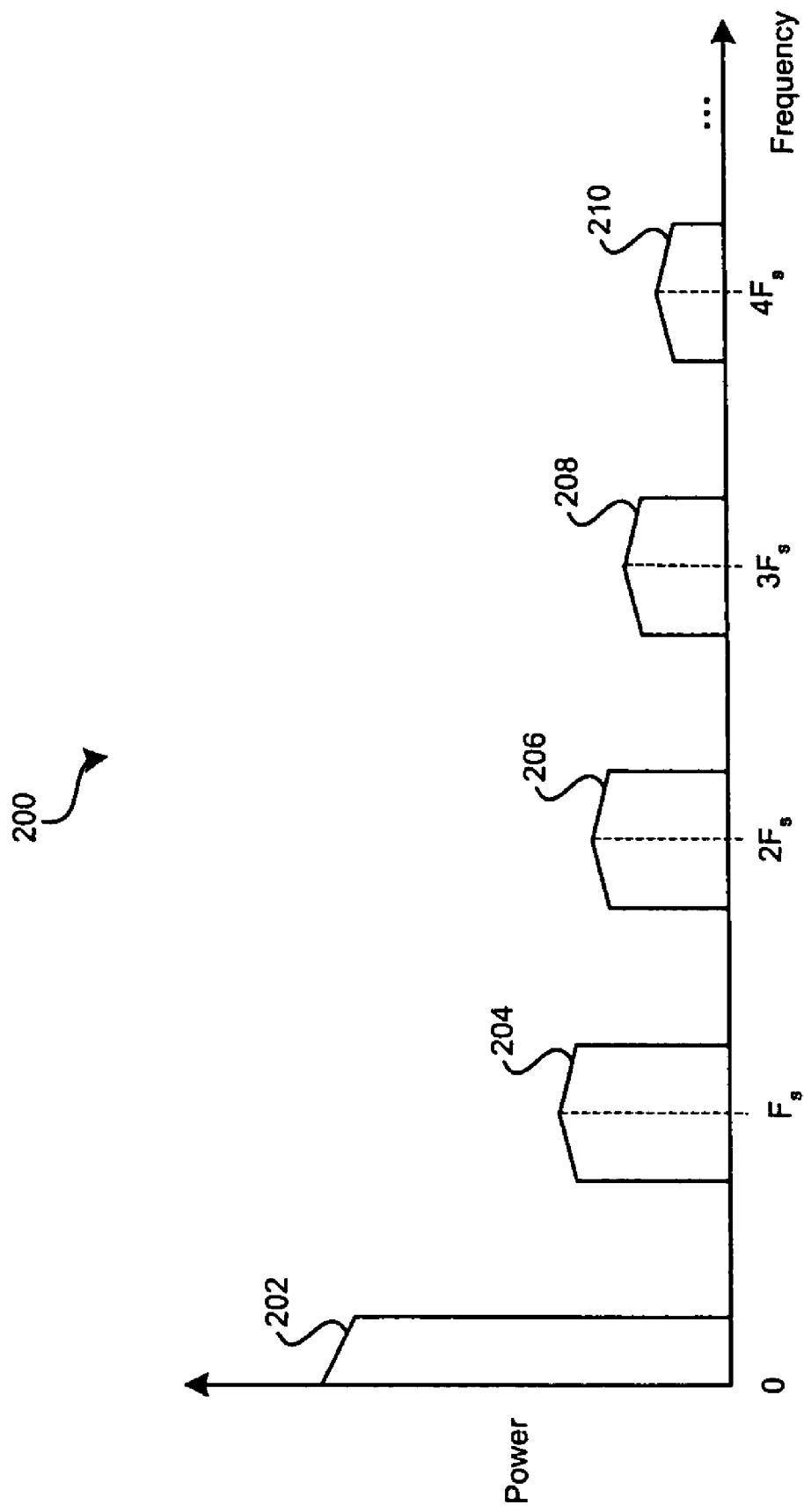
FIG. 2 is a graph 200 illustrating a differential waveform power spectral density (PSD) for the direct drive transmitter of FIG. 1.

Certain embodiments of the invention provide a method and system for reducing transmitter emissions. The method for reducing transmitter emissions may include partitioning an encoder block into at least a first group of encoder processing cells and a second group of encoder processing cells. A DAC block may also be partitioned into at least a first group of DAC processing cells and a second group of DAC processing cells. In a case where a 2× partitioning may be utilized, the encoder block may be partitioned into a first group comprising odd encoder processing cells and a second group comprising even encoder processing cells. Similarly, the DAC block may be partitioned into a first group comprising odd DAC processing cells and a second group comprising even DAC processing cells.

In accordance with the invention, the first group of encoder processing cells may be coupled to the first group of DAC processing cells and the second group of encoder processing cells may be coupled to the second group of DAC processing cells. The first group of encoder processing cells may be clocked using a first clock signal and the second group of encoder processing cells may be clocked using a second clock signal. The second clock signal may be generated so that it is a delayed version of the first clock signal. Notwithstanding, although a 2× partition may be utilized to illustrate various aspects and/or embodiments of the invention, various levels of partitioning may be utilized to provide various levels of reduced transmitter emissions. For example, 4×, 8×, 16× partitioning may be used to provide progressively greater levels of emissions reduction.

Another embodiment of a reduced emission transmitter may comprise an encoder partitioned into at least a group of odd encoder processing cells and a group of even encoder processing cells. A DAC may be partitioned into at least a group of odd DAC processing cells for processing outputs of the group of odd encoder processing cells, and a group of even DAC processing cells for processing outputs of the group of even encoder processing cells. The reduced emission transmitter may further comprise an aggregator that aggregates the outputs of the odd DAC processing cells and the outputs of the even DAC processing cells to generate a reduced emissions analog DAC output. At least one clock generator is provided, which generates a first clock signal and a second clock signals that clocks the even encoder processing cells, and the odd encoder processing cells respectively. The second clock signal is a delayed version of the first clock signal.

U.S. Pat. No. 6,411,647 to Chan describes a power efficient and reduced electromagnetic interference (EMI) emissions transmitter for unshielded twisted pair (UTP) data communication applications. Transmit data is interpolated by N and processed by a digital filter to obtain the pulse shape required by the particular communication application. A digital-to-analog converter is adapted to convert the output of the digital filter to a current-mode analog waveform. The digital filter is integrated with a DAC binary decoder in a memory device such as a ROM having a time multiplexed output. This logical implementation and memory eliminated a need for utilizing digital filtering circuits, DAC decoding logic circuit and re-synchronization logic circuits that are conventionally implemented in hardware. Accordingly, the hardware functionality provided by these circuits is rendered into arithmetic form and implemented in a memory device. U.S. Pat. No. 6,411,647 is incorporated herein by reference in its entirety.

U.S. Pat. No. 6,332,004 to Chan entitled "Analog discrete-time filtering for unshielded twisted pair data communication" assigned to Broadcom Corporation of Irvine, Calif., discloses exemplary techniques that may be utilized to provide a higher degree of interpolation. U.S. Pat. No. 6,332,004 describes a power efficient and reduced electromagnetic interference (EMI) emissions transmitter that may be utilized for unshielded twisted pair data communication applications. In this regard, the transmitter includes a digital-to-analog converter which is adapted to convert input transmit data to a current-mode analog waveform. A discrete-time analog filter is integrated with a DAC line driver to provide additional EMI emissions suppression. A plurality of output cells are adapted to produce an output signal that is responsive to a plurality of digitized input data samples. A timing circuit generates timing signals for dividing each digitized input data sample into a first time segment and a second time segment. Suitable control logic coupled to each output cell is adapted to generate control signals to drive each output cell to produce a portion of the output signal for the first time segment and the full output signal for the second time segment. U.S. Pat. No. 6,332,004 is incorporated herein by reference in its entirety.

Figure 3:
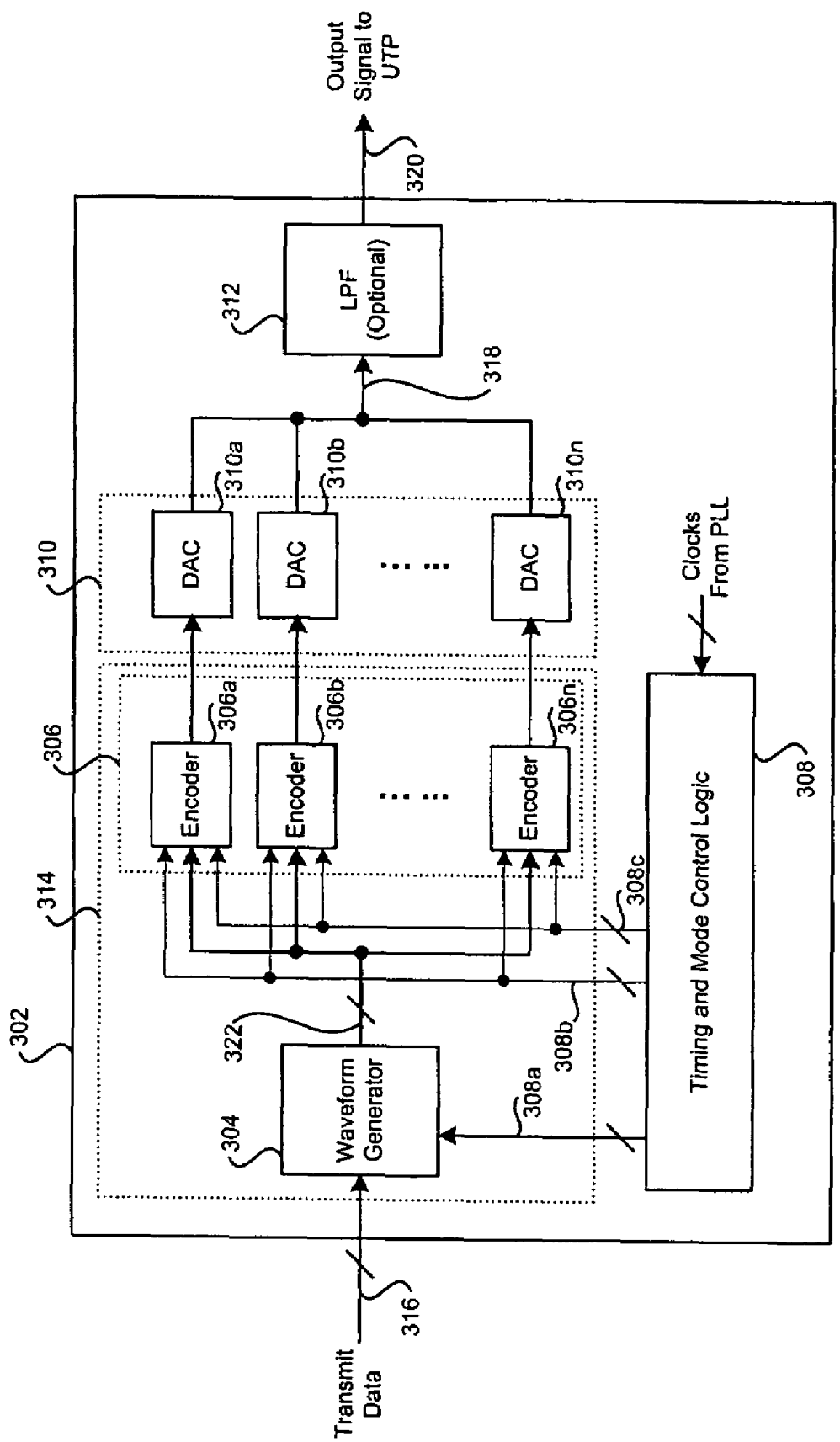
FIG. 3 is a block diagram illustrating a reduced emissions direct drive transmitter in accordance with an embodiment of the invention.

FIG. 3 is a block diagram 300 illustrating a reduced emissions direct drive transmitter in accordance with an embodiment of the invention. Referring to FIG. 3, there is shown an integrated waveform generator/encoder block 302, a timing and mode control logic block 308, a digital-to-analog converter (DAC) block 310 and a low pass filter (LPF) block 312. The low pass filter block 312 may be an optional processing block, which may include suitable low pass filtering and line driver circuitry utilized for impedance and load matching, for example. The waveform generator/encoder block 302 may include a waveform generator block 304 and an encoder block 306. The timing and mode control logic block 308 may be referred to as a clock generator block.

The encoder block 306 may include a plurality of encoder cell blocks 306a, 306b, . . . 306n. Each of the encoder cell blocks 306a, 306b, . . . , 306n may contain a plurality of DAC encoder processing cells. The encoder processing cells in each of the encoder cell blocks 306a, 306b, . . . , 306n may be referred to as a group of DAC encoder cells. The DAC block 310 may include a plurality of DAC cell blocks 310a, 310b, . . . , 310n. Each of the DAC cell blocks 310a, 310b, . . . , 310n may contain a plurality of DAC processing cells. The DAC processing cells in each of the DAC cell blocks 310a, 310b, . . . 310n may referred to as a group of DAC processing cells. The outputs of each group of encoder cells 306a, 306b, . . . , 306n may be coupled to a corresponding input of one of the groups of DAC processing cells. For example, an output of a first group of encoder processing cells 306a may be coupled to a first group of DAC processing cells 310a. Similarly, an output of a second group of encoder processing cells 306b may be coupled to a first group of DAC processing cells 310b, and so on. Finally, an output of the $n^{th}$ group of encoder processing cells 306n may be coupled to the $n^{th}$ group of DAC processing cells 310n.

The waveform generator block 304 may be coupled so that it receives one or more of a plurality of transmitted input data signals 316. These transmitted input data signals 316 may be digital signals. An output signal 320 of the optional low pass filter 312 may be transmitted to an unshielded twisted pair (UTP). In a case where the optional low pass filter block 312 is not present, output signal 318 of DAC block 310 may be transmitted to the unshielded twisted pair. The optional low pass filter block 312 may be added to the output of the DAC block 310 to further assist in reducing unwanted emissions. The optional low pass filter block 312 may be a capacitor although the invention is not limited in this regard.

The waveform generator block 304 may include suitable circuitry such as a digital filter that may be adapted to generate waveform data corresponding to the transmitted input data signals 316. The waveform generator block 304 may be adapted to over-sample or interpolate the transmitted input data signals 316 to produce a higher rate waveform data. For example, the waveform generator block 304 may be adapted to receive a 20 mega samples per second (Msps) transmitted input data signal, interpolate the signal by a factor of 16× to produce waveform data at 320 Msps. The waveform generator block 304 may be adapted to produce a plurality of output signals 322.

An input of the each of the groups of encoder processing cells 306a, 306b, . . . , 306n may be coupled to the output of the waveform generator block 304. Accordingly, the output signals 322 function as input signals for each of the groups of encoder processing cells 306a, 306b, . . . , 306n.

The encoder block 306 may include suitable DAC encoder circuitry that may be adapted to convert the generated waveform data into control words to be processed by the DAC block 110. Encoding functions executed by the encoder block 306 may be integrated with functions of the waveform generator 304 into a single waveform generator/encoder block 314.

The timing and mode control logic block 308 includes suitable clock and selector circuitry that may be adapted to control the waveform generator block 304 and the encoder block 306. The timing and mode control logic block 308 may produce these controls from, for example, either clocks from a phase lock loop (PLL) or from other suitable timing sources. The timing and mode control logic block 308 may be adapted to generate waveform generator clocks 308a, which may be utilized by the waveform generator block 304. The timing and mode control logic block 308 may also be adapted to generate encoder clocks 308b and delayed encoder clocks 308c, which may be utilized by the encoder block 306. In this regard, the encoder clocks 308b and the delayed encoder clocks 308c may be coupled to each of the groups of DAC processing cells 310a, 310b, . . . , 310n.

An input of each group of the DAC processing cells in the DAC block 310 may be coupled to an output of the corresponding group of encoder processing cells in the encoder block 306. Each of the groups of DAC processing cells in the DAC block 310 may include suitable DAC circuitry that may be adapted to convert the code words generated by the corresponding group of encoder processing cells of the encoder block 306 into suitable waveforms contained in output signal 318. The encoded code words generated by each of the groups of encoder processing cells 306a, 306b, . . . , 306n of the encoder block 306 may be provided to the DAC block 310 at a suitable sampling rate, which may cause the DAC block 110 to produce output waveforms at the sampling rate.

In accordance with an embodiment of the invention, the reduced emissions drive transmitter may be adapted to partition the encoder block 306 into distributed equal groups. In one aspect of the invention, the encoder block 306 may be partitioned into two halves so that a first half of the encoder processing cells within encoder block 306 may control even DAC cells and a second half of the encoder processing cells may control the odd DAC cells. The reduced emissions transmitter may partition the DAC block into two corresponding distributed equal groups. This partitioning of the encoder blocks 306 and the DAC blocks 310 may be referred to as 2× partitioning. Other partitioning such as 4×, 8×, 16× and so on may be provided to further reduce emissions. In one aspect of the invention, the DAC block 310 may be partitioned into two halves so that a first half of the DAC processing cells in the DAC block 310 includes even DAC cells and a second half includes odd DAC processing cells. To provide separate and independent processing by the groups of encoder processing cells and the groups of DAC processing cells, the clock and selector signals generated by the timing and mode control logic block 308 may be separated.

Although the encoder block 306 may be equally partitioned into two halves, there are instances when partitioning may result in unequal groups of encoder processing cells. Thus, after partitioning, there may be a number of remainder cells. The partitioning may be done so that the number of partitioned cells may be significantly greater that the number of remainder cells. In such instances, there may be a small leakage of image power that may be difficult to filter or otherwise eliminate. However, the greater the number of partitioned cells, the lesser any image power that may be not filtered or eliminated. In certain instances, the encoder code words may not result in distributed equal DAC transitions occurring for every change of the output. In this case, the greater the number of partitioned cells, the lesser any image power that may be not filtered or eliminated.

Figure 4:
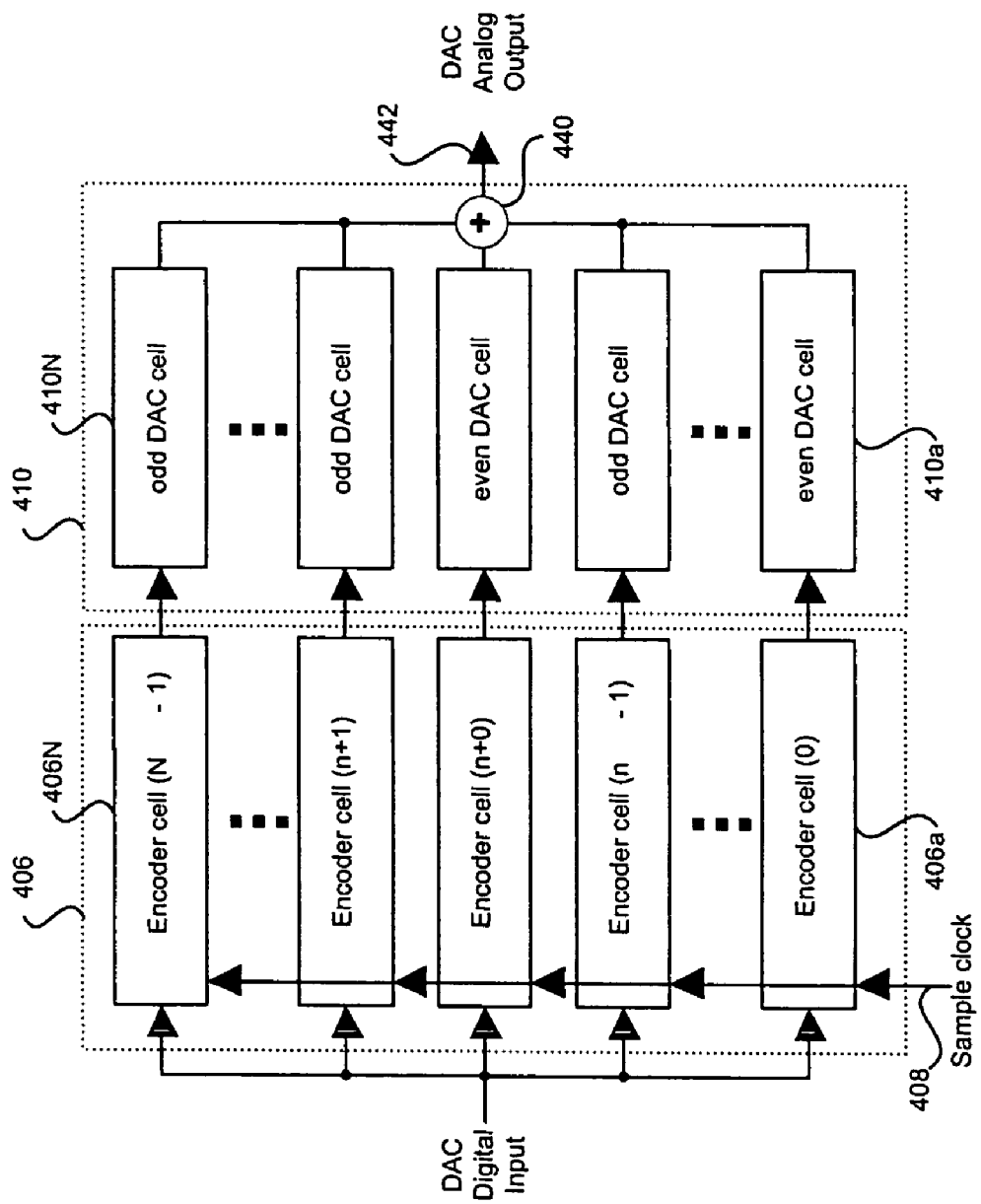
FIG. 4 is a block diagram illustrating encoder and DAC grouping in a conventional direct drive transmitter.

FIG. 4 is a block diagram illustrating encoder and DAC grouping in a conventional direct drive transmitter. Referring to FIG. 4, there is shown an encoder processing group 406, a DAC processing group 410, an aggregator or combiner 440 and sample clock signal 408. The encoder processing group 406 may include a plurality of encoder processing cells. Each encoder processing cell may be partitioned and designated as an odd or even cell.

The DAC processing group 410 may include a plurality of DAC processing cells. Each DAC processing cell may be partitioned and designated an odd or even cell. Each DAC processing cell may be coupled to a corresponding partitioned encoder cell. For example, an even DAC processing cell may be coupled to an even encoder processing cell 406a. Similarly, an odd DAC processing cell 410N may be coupled to an odd encoder processing cell 406N. In the conventional direct drive transmitter arrangement as illustrated in FIG. 4, each encoder processing cell, whether odd or even, may be clocked by sample clock signal 408. As a result, the output of each encoder processing cell is a single step transition waveform that is provided as an input to the corresponding DAC cell. The DAC analog output signal is an aggregation of the odd and even DAC processing cells. In this regard, the aggregator or combiner 440 may combine the outputs of the odd and even DAC processing cells to create the DAC output signal 442. In a unary DAC architecture, the DAC analog output signal is proportion to the number of equally weighted DAC cells.

Figure 5:
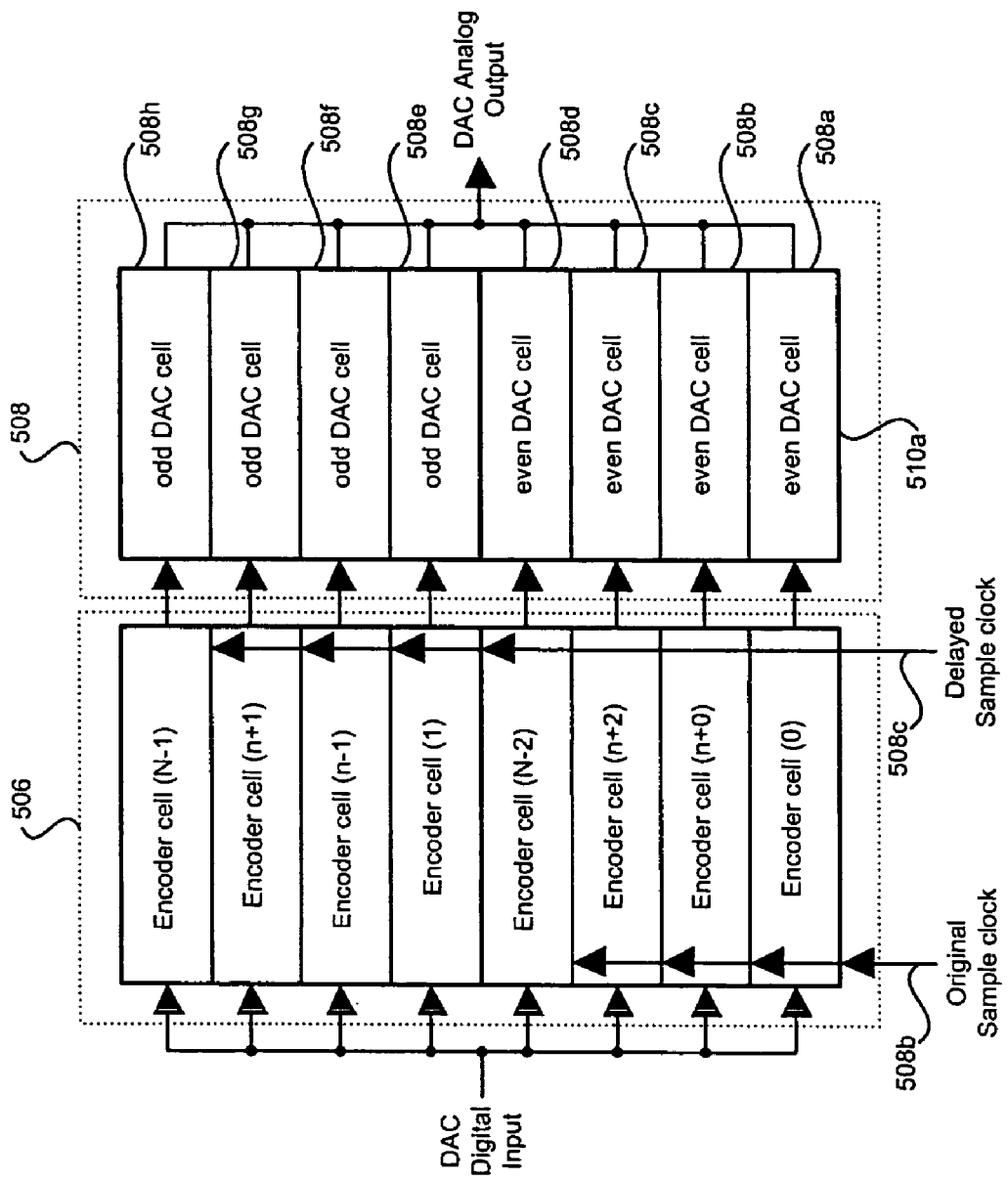
FIG. 5 is a block diagram illustrating encoder and DAC grouping in a reduced emissions direct drive transmitter in accordance with an embodiment of the invention.

FIG. 5 is a block diagram illustrating encoder and DAC grouping in a reduced emissions direct drive transmitter in accordance with an embodiment of the invention. Referring to FIG. 5, there is shown an encoder block 506 having a first group of encoder processing cells consisting of encoder cell (0), encoder cell (n+0), encoder cell (n+2) and encoder cell (N−2). This may be designated an even group of encoder processing cells. Encoder block 506 may also include a second group of encoder processing cells comprising encoder cell (1), encoder cell (n−1), encoder cell (n+1) and encoder cell (N−1). This may be designated as an odd group of encoder processing cells.

The reduced emissions direct drive transmitter in accordance with an embodiment of invention may also include a DAC block 508 having a first group of DAC processing cells and a second group of DAC processing cells. The first group of DAC processing cells may be designated as an even group of DAC processing cells, while the second group of DAC processing cells may be designated as an odd group of DAC processing cells. The even group of DAC processing cells may include DAC processing cells 508a, 508b, 508c, and 508d. The odd group of DAC processing cells may include DAC processing cells 508e, 508f, 508g, and 508h. Each of the DAC processing cells in the even group of DAC processing cells may be coupled to a corresponding encoder processing cell in the even group of encoder processing cells. For example, an input of DAC processing cell 508a may be coupled to an output of encoder cell (0). An input of DAC processing cell 508b may be coupled to an output of encoder cell (n+0). An input of DAC processing cell 508c may be coupled to an output of encoder cell (n+2). Finally, an input of DAC processing cell 508d may be coupled to an output of encoder cell (N+2). Each of the DAC processing cells in the odd group of DAC processing cells may be coupled to a corresponding encoder processing cell in the odd group of encoder processing cells. For example, an input of DAC processing cell 508e may be coupled to an output of encoder cell (1). An input of DAC processing cell 508f may be coupled to an output of encoder cell (n−1). An input of DAC processing cell 508g may be coupled to an output of encoder cell (n+1). Finally, an input of DAC processing cell 508h may be coupled to an output of encoder cell (N−1).

In the reduced emissions direct drive transmitter in accordance with an embodiment of the invention, an original sampled clock signal 508b may be coupled to a first group of encoder processing cells. Additionally, a delayed version of the original sample clock, namely delayed sample clock 508c may be coupled to a second group of encoder processing cells. As illustrated in FIG. 5, the original sample clock signal is coupled to the odd group of encoder processing cells, namely encoder processing cell (0), encoder processing cell (n+0), encoder processing cell (n+2) and encoder processing cell (N−2). The delayed sample clock signal 508c is coupled to the even group of encoder processing cells, namely encoder processing cell (1), encoder processing cell (n−1), encoder processing cell (n+2) and encoder processing cell (N−1).

The DAC analog output signal is an aggregation of the odd and even DAC processing cells. Since the encoder cells are grouped and activated from delayed versions of the single clock signal, the input signal to each of the DAC processing cells is a distributed transition waveform. In accordance with the invention, the distributed partitioning and grouping of the encoder block and the DAC block with the appropriate delay, may cause a proportion of each transition in the DAC differential waveform to be delayed. The ideal time delay may be proportional to the number of the transition steps that is being delayed.

Figure 6:
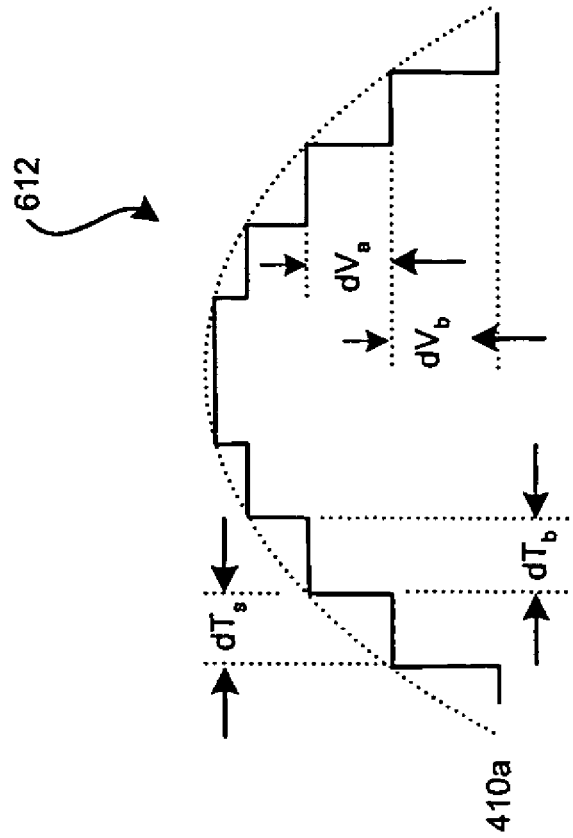
FIG. 6 is a diagram that illustrates various differences in the waveform generated by a conventional direct drive transmitter and a reduced emissions direct drive transmitter in accordance with an embodiment of the invention.
Figure 6:
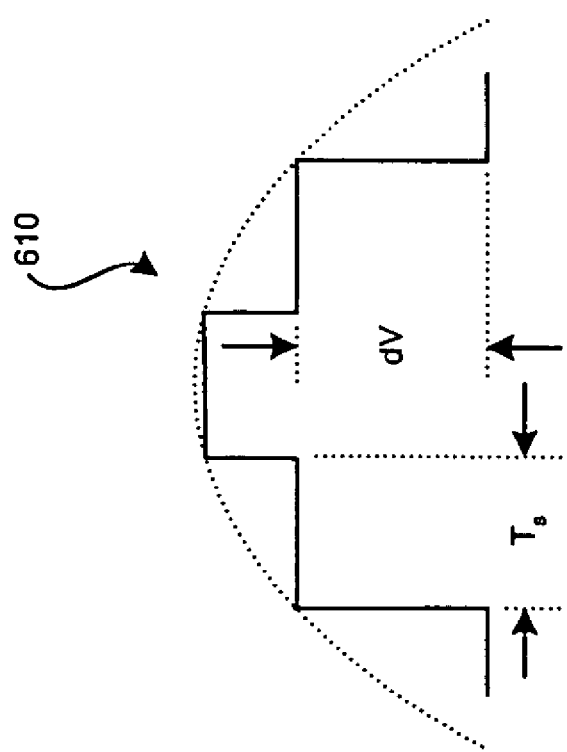

FIG. 6 is a diagram that illustrates various differences in the waveform generated by a conventional direct drive transmitter and a reduced emissions direct drive transmitter in accordance with an embodiment of the invention. Referring to FIG. 6, waveform 602 represents an output signal generated by a conventional direct drive transmitter. Waveform 612 represents an output signal generated by a reduced emissions direct drive transmitter in accordance with an aspect of the invention. Referring to waveform 612, $dT_a$ which signifies $\delta T_a$ represents the change in the sample time for an first group which may be an odd group. Similarly, $dT_b$ which signifies $\delta T_b$ represents the change in the sample time for an second group which may be an even group. The change in voltage over a corresponding sample period for the first group may be represented by $dV_a$ which signifies $\delta V_a$. Similarly, the change in voltage over a corresponding sample period for the second group may be represented by $dV_b$ which signifies $\delta V_b$.

In an aspect of the invention, the distributed partitioning and grouping of the encoder processing cells and the DAC processing cells, along with the appropriate delay provided by the original and delayed clock signals may result in a portion of each transition in the DAC differential waveform being delayed. An ideal delay time may be proportional to the number of transition steps that is being delayed. For example, in a case where each transition is partitioned into two groups, then ideally:

$$dV_a = dV_b = \tfrac{1}{2} dV; \text{ and}$$

$$dT_a = dT_b = \tfrac{1}{2} T_s.$$

In accordance with another embodiment of the invention, further partitioning may be done on the encoder block and the DAC block using smaller values for dV and dT. Accordingly, this effectively provides a much better processing resolution for the reduced emissions direct drive transmitter. This may result in much smoother DAC output waveform where abrupt sharp edges of the original waveform may be distributed over time and voltage in the new waveform.

Figure 7:
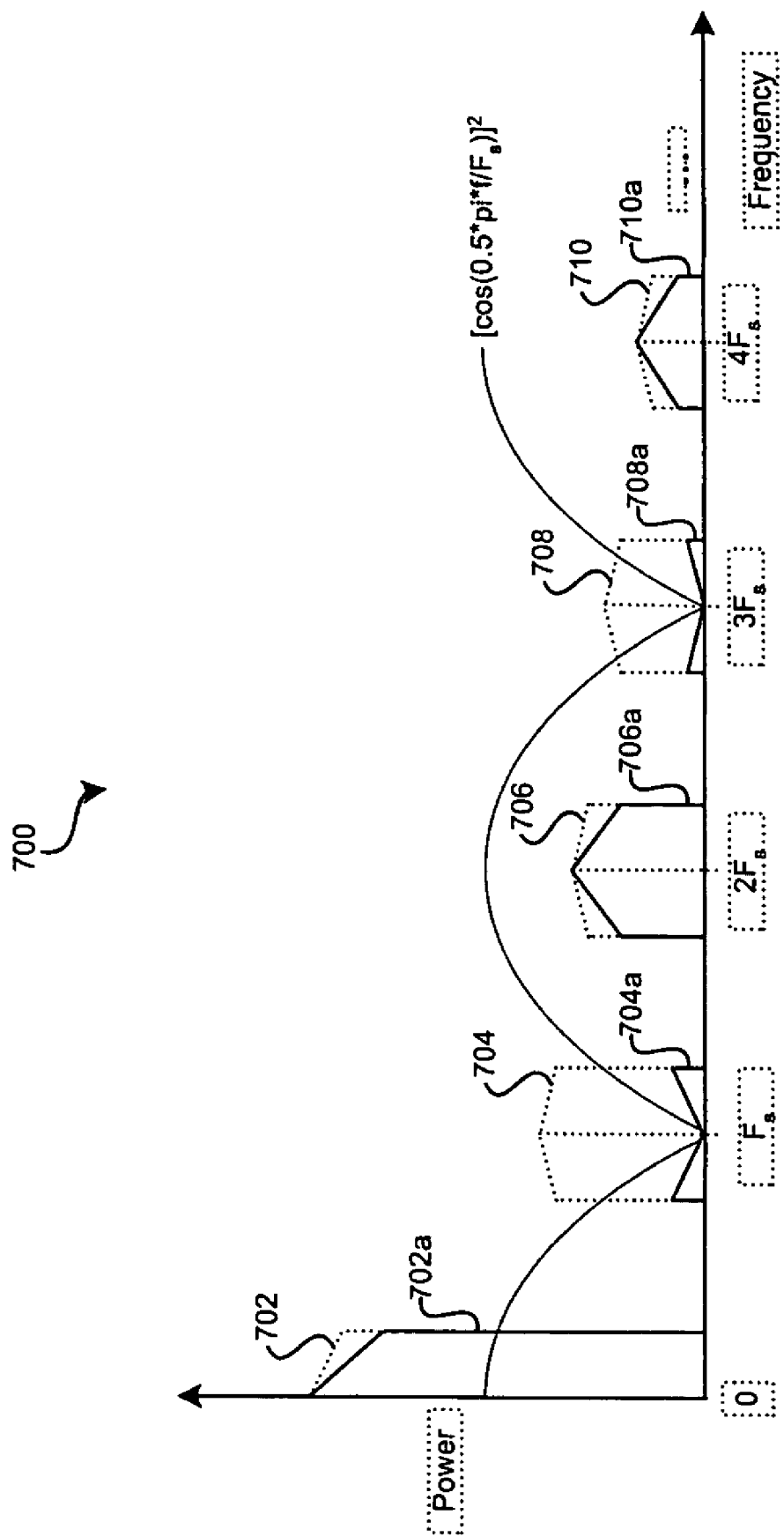
FIG. 7 is a graph illustrating a differential waveform power spectral density (PSD) for the reduced emission direct drive transmitter of FIG. 3 in accordance with an aspect of the invention.

FIG. 7 is a graph 700 illustrating a differential waveform power spectral density (PSD) for the reduced emission direct drive transmitter of FIG. 3 in accordance with an aspect of the invention. Referring to FIG. 7, the vertical axis represents power and the horizontal axis represents the frequency. The power (P) of the image frequencies may be represented as follows:

$P = $ Power of Baseband Signal $*[\sin(2*\pi*f/F_s)/(2*\pi*f/F_s)*\cos(\frac{1}{2}-\pi*f/F_s)]^2$, where f represents the frequency and $F_s$ represents the sample frequency.

The original baseband signal 702 centered on a frequency of zero (0) is represented by 702a, while the corresponding baseband signal resulting from the reduced emission direct drive transmitter is represented by 702a. The variations in the baseband signals 702 and 702a are minimal. The original first image frequency centered on a frequency of $F_s$ is represented by 704, while the corresponding first image frequency for the reduced emission direct drive transmitter is represented by 704a. A comparison between 704 and 704a illustrates a significant reduction in the first image frequency. The original second image frequency centered on a frequency of $2F_s$ is represented by 706, while the corresponding second image frequency for the reduced emission direct drive transmitter is represented by 706a. A comparison between 706 and 706a illustrates very little variation between image frequencies 706 and 706a. The original third image frequency centered on a frequency of $3F_s$ is represented by 708, while the corresponding third image frequency for the reduced emission direct drive transmitter is represented by 708a. A comparison between 708 and 708a illustrates a significant reduction in the third image frequency. The original fourth image frequency centered on a frequency of $4F_s$ is represented by 710, while the corresponding fourth image frequency for the reduced emission direct drive transmitter is represented by 710a. A comparison between 710 and 710a illustrates very little variation between image frequencies 710 and 710a.

In accordance with an embodiment of the invention, the reduced emissions direct drive transmitter may be adapted to filter a discrete time waveform. In this regard, the transfer function of the reduced emissions direct drive transmitter applies nulls at Fs, 3*Fs and so on. Since the power of the filtered images at, for example, Fs and 3*Fs are significantly reduced, the emissions from differential-to-common-mode conversion of image energies is significantly reduced. Although the reduced emissions direct drive transmitter optimally applies nulls at frequencies such as Fs and 3*Fs, it does not add significant complexity to the digital filter, the encoder block or the DAC blocks.

Figure 8:
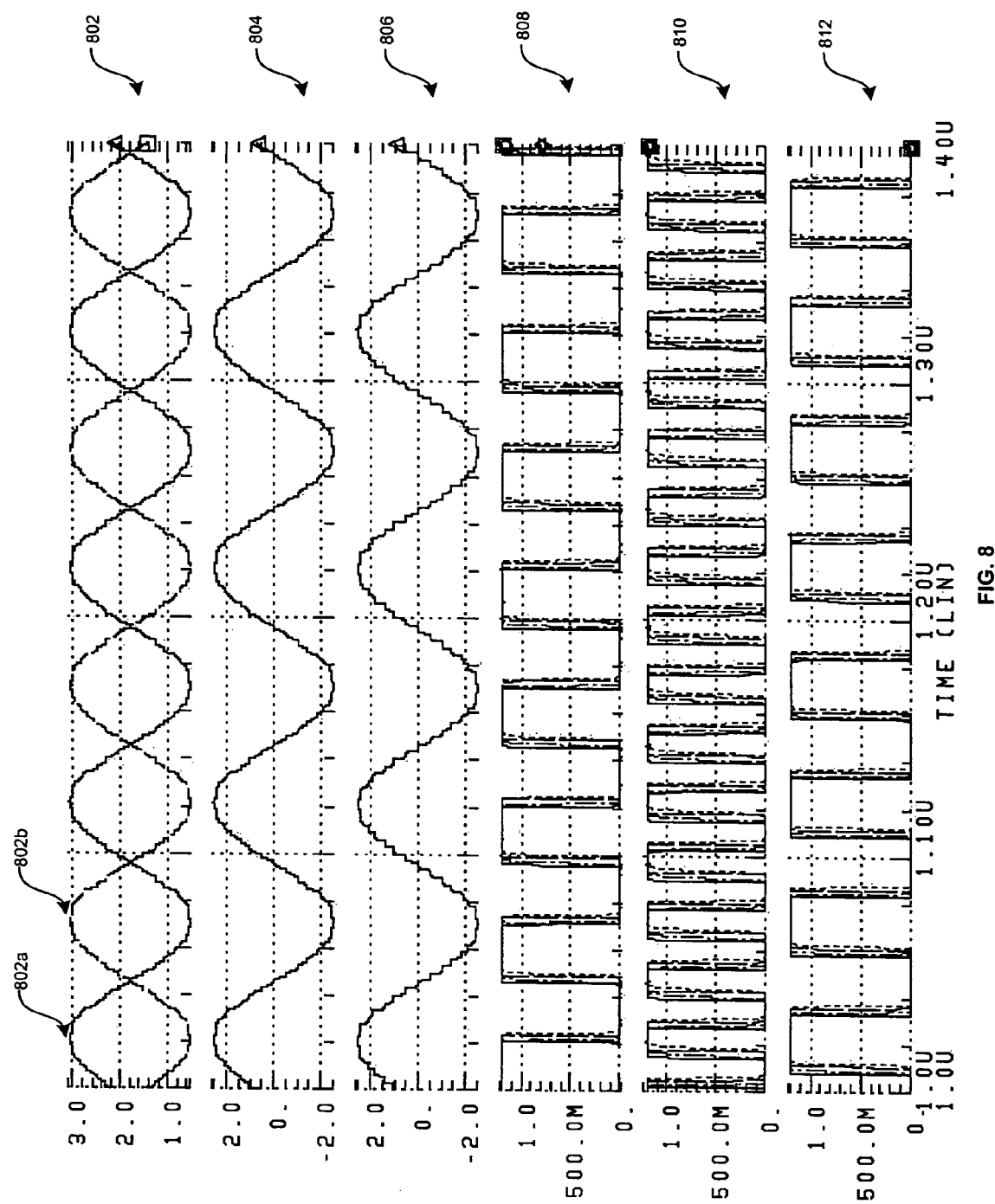
FIG. 8 is a graph of a time domain simulation illustrating an output signal for a reduced emissions direct drive transmitter in accordance with an embodiment of the invention as compared to an output of a conventional direct drive transmitter.

FIG. 8 is a graph of a time domain simulation illustrating an output signal for a reduced emissions direct drive transmitter in accordance with an embodiment of the invention as compared to an output of a conventional direct drive transmitter. Referring to FIG. 8, there is shown a first waveform panel 802 that illustrates single ended signals for a reduced emissions direct drive transmitter in accordance with an embodiment of the invention. The first waveform panel 802 includes signal 802a and signal 802b. A second waveform panel 804 represents a differential signal for the reduced emissions direct drive transmitter in accordance with an embodiment of the invention. The second waveform panel 804 represents the signal 802a. A third waveform panel 806 represents a differential signal for a conventional direct drive transmitter. The fourth, fifth and sixth waveform panels, namely 808, 810 and 812 respectively, represents original and skewed control signals for the low emissions direct drive transmitter. Referring to FIG. 8, the differential signal of the reduced emissions direct drive transmitter is much smoother than the differential signal of original or conventional direct drive transmitter. Notably, the second waveform panel 804 contains much less edges than the third waveform panel 806 produced by the conventional direct drive transmitter. Accordingly, the reduced emissions direct drive transmitter will produce lower emissions than the original or conventional direct drive transmitter.

Figure 9:
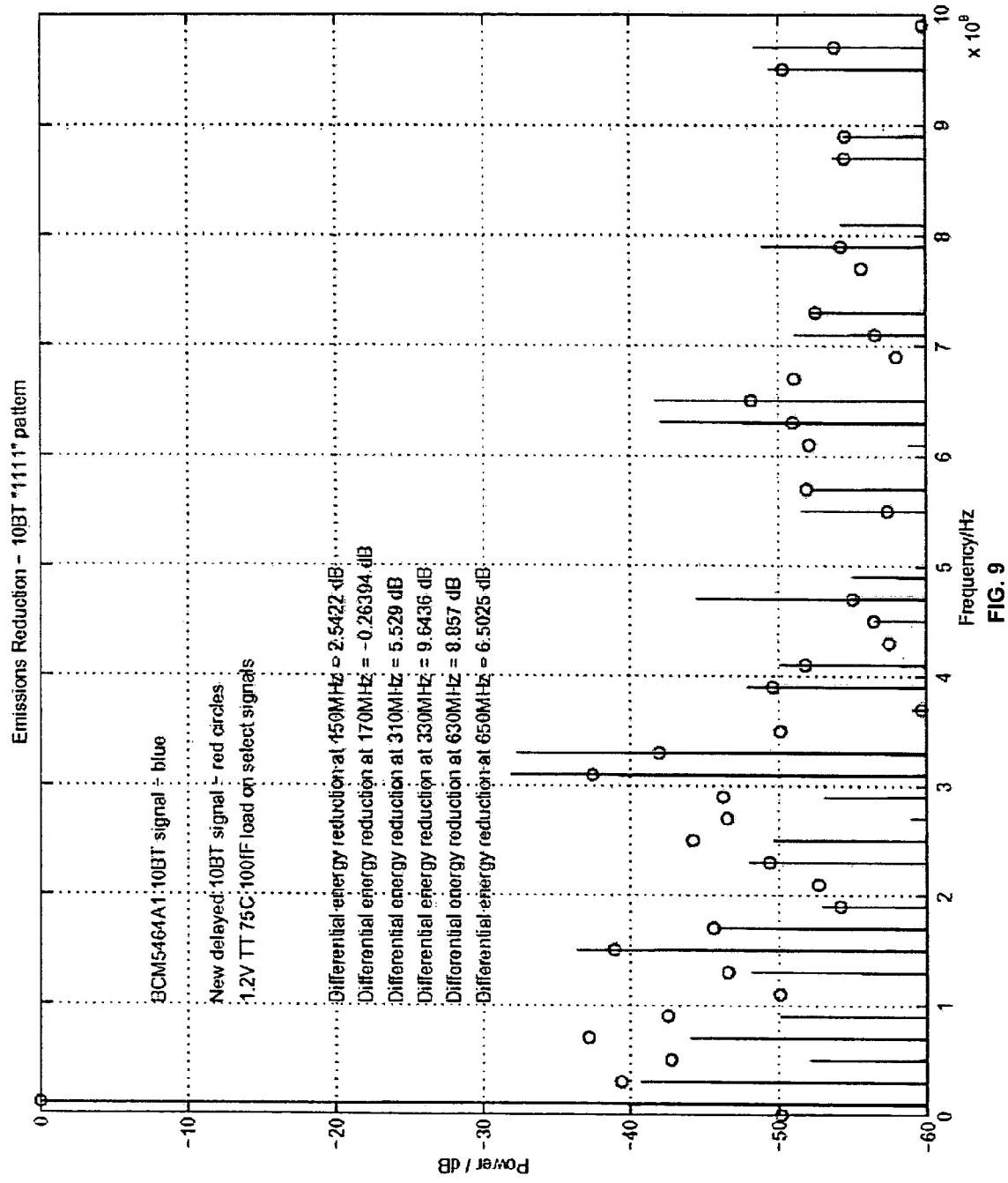
FIG. 9 is a graph of a frequency domain simulation illustrating an output signal for a reduced emissions direct drive transmitter in accordance with an embodiment of the invention as compared to an output of a conventional direct drive transmitter.

FIG. 9 is a graph of a frequency domain simulation illustrating an output signal for a reduced emissions direct drive transmitter in accordance with an embodiment of the invention as compared to an output of a conventional direct drive transmitter. Referring to FIG. 9, the power spectral density of an original or conventional direct drive transmitter is represented by the vertical lines, and the power spectral density of the reduced emissions direct drive transmitter is represented by the circles. A Manchester code signal of "1111" may produce spurs at around 320 MHz and 640 MHz. However, the transmitted energy at 310 MHz and 330 MHz, where the $1^{st}$ image may be located, may be reduced by more than 5 dB. Moreover, the transmitted energy at 630 MHz and 650 MHz, where the $2^{nd}$ image may be located, may be reduced by more than 6 dB.

In light of the foregoing, the reduced emissions direct drive transmitter may be adapted to target troublesome images and effectively minimizes them by applying nulls at the image center frequencies. Notably, the reduced emissions direct drive transmitter may effectively minimize troublesome images without adding complexity and significant cost to the direct drive transmitter. Furthermore, the reduced emissions direct drive transmitter may be utilized in high port density applications such as in Gigabit switches. Although a 2× or double partitioning of the encoder block and the DAC block has been utilized, the invention may be adapted to utilize greater partitioning in the encoder block and the DAC block. Accordingly, greater partitioning of the encoder block and the DAC block may result in better image rejection. The reduced emissions direct drive transmitter may also be utilized in other applications such as those involving direct transmissions where it may be important to minimize post-DAC filtering of images. Exemplary applications may include, but are not limited to, set-top boxes, cable modems, satellite communication and digital subscriber line (DSL) applications.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing information in a direct drive transmitter, the method comprising:
   partitioning an encoder into at least a group of odd encoder processing cells and a group of even encoder processing cells;
   partitioning a DAC into at least a group of odd DAC processing cells for processing outputs of said group of odd encoder processing cells;
   partitioning said DAC into a group of even DAC processing cells for processing outputs of said group of even encoder processing cells; and
   aggregating said outputs of said odd DAC processing cells and said outputs of said even DAC processing cells to generate a reduced emissions analog DAC output.

2. The method according to claim 1, further comprising clocking said odd encoder processing cells via a first clock signal.

3. The method according to claim 2, further comprising clocking said even encoder processing cells via a second clock signal, wherein said second clock signal is a delayed version of said first clock signal.

4. The method according to claim 1, further comprising generating a digital output from each of said odd encoder processing cells.

5. The method according to claim 4, further comprising converting said digital output from each of said odd encoder processing cells by a corresponding one of said odd DAC processing cells to a corresponding analog signal.

6. The method according to claim 1, further comprising generating a digital output from each of said even encoder processing cells.

7. The method according to claim 6, further comprising converting said digital output from each of said even encoder processing cells by a corresponding one of said even DAC processing cells to a corresponding analog signal.

8. The method according to claim 1, further comprising minimizing leakage of image power by minimizing a remainder of encoder processing cells during said partitioning of said encoder.

9. The method according to claim 1, wherein if said partitioning of said encoder results in a remaining portion of encoder processing cells, said partitioning of said encoder is done so that said group of odd encoder processing cells and said group of even encoder processing cells is substantially greater than said remaining portion of said encoder processing cells.

10. The method according to claim 1, wherein if said partitioning of said DAC results in a remaining portion of DAC processing cells, said partitioning of said DAC is done so that said group of odd DAC processing cells and said group of even DAC processing cells is substantially greater than said remaining portion of said DAC processing cells.

11. A machine-readable storage having stored thereon, a computer program having at least one code section for processing information in a direct drive transmitter, the at least one code section being executable by a machine for causing the machine to perform steps comprising:
   partitioning an encoder into at least a group of odd encoder processing cells and a group of even encoder processing cells;
   partitioning a DAC into at least a group of odd DAC processing cells for processing outputs of said group of odd encoder processing cells;
   partitioning said DAC into a group of even DAC processing cells for processing outputs of said group of even encoder processing cells; and
   aggregating said outputs of said odd DAC processing cells and said outputs of said even DAC processing cells to generate a reduced emissions analog DAC output.

12. The machine-readable storage according to claim 11, further comprising clocking said odd encoder processing cells via a first clock signal.

13. The machine-readable storage according to claim 12, further comprising code for clocking said even encoder processing cells via a second clock signal, wherein said second clock signal is a delayed version of said first clock signal.

14. The machine-readable storage according to claim 11, further comprising code for generating a digital output from each of said odd encoder processing cells.

15. The machine-readable storage according to claim 14, further comprising code for converting said digital output from each of said odd encoder processing cells by a corresponding one of said odd DAC processing cells to a corresponding analog signal.

16. The machine-readable storage according to claim 11, further comprising generating a digital output from each of said even encoder processing cells.

17. The machine-readable storage according to claim 16, further comprising code for converting said digital output from each of said even encoder processing cells by a corresponding one of said even DAC processing cells to a corresponding analog signal.

18. The machine-readable storage according to claim 11, further comprising code for minimizing leakage of image power by minimizing a remainder of encoder processing cells during said partitioning of said encoder.

19. The machine-readable storage according to claim 11, further comprising code for partitioning said encoder so that said group of odd encoder processing cells and said group of even encoder processing cells is substantially greater than said remaining portion of said encoder processing cells, if said partitioning of said encoder results in a remaining portion of encoder processing cells.

20. The machine-readable storage according to claim 11, further comprising code for partitioning said DAC so that said group of odd DAC processing cells and said group of even DAC processing cells is substantially greater than said remaining portion of said DAC processing cells, if said partitioning of said DAC results in a remaining portion of DAC processing cells.

21. A system for processing information in a direct drive transmitter, the system comprising:
an encoder partitioned into at least a group of odd encoder processing cells and a group of even encoder processing cells;
a DAC partitioned into at least:
a group of odd DAC processing cells for processing outputs of said group of odd encoder processing cells; and
a group of even DAC processing cells for processing outputs of said group of even encoder processing cells; and
an aggregator that aggregates said outputs of said odd DAC processing cells and said outputs of said even DAC processing cells to generate a reduced emissions analog DAC output.

22. The system according to claim 21, further comprising at least one clock generator that generates a first clock signal that clocks said odd encoder processing cells.

23. The system according to claim 22, wherein said at least one clock generator generates a second clock signal that clocks said even encoder processing cells, and said second clock signal is a delayed version of said first clock signal.

24. The system according to claim 21, wherein said odd encoder processing cells generates a digital output.

25. The system according to claim 24, wherein said odd DAC processing cells converts said digital output from each of a corresponding one of said odd encoder processing cells to a corresponding analog signal.

26. The system according to claim 21, wherein said even encoder processing cells generates a digital output.

27. The system according to claim 26, wherein said even DAC processing cells converts said digital output from each of a corresponding one of said even encoder processing cells to a corresponding analog signal.

28. The system according to claim 21, wherein leakage of image power is minimized by minimizing a remainder of encoder processing cells in said partitioned encoder.

29. The system according to claim 21, wherein if said partitioning of said encoder results in a remaining portion of encoder processing cells, said partitioning of said encoder is done so that said group of odd encoder processing cells and said group of even encoder processing cells is substantially greater than said remaining portion of said encoder processing cells.

30. The system according to claim 21, wherein if said partitioning of said DAC results in a remaining portion of DAC processing cells, said partitioning of said DAC is done so that said group of odd DAC processing cells and said group of even DAC processing cells is substantially greater than said remaining portion of said DAC processing cells.

* * * * *